United States Patent Office 3,631,013
Patented Dec. 28, 1971

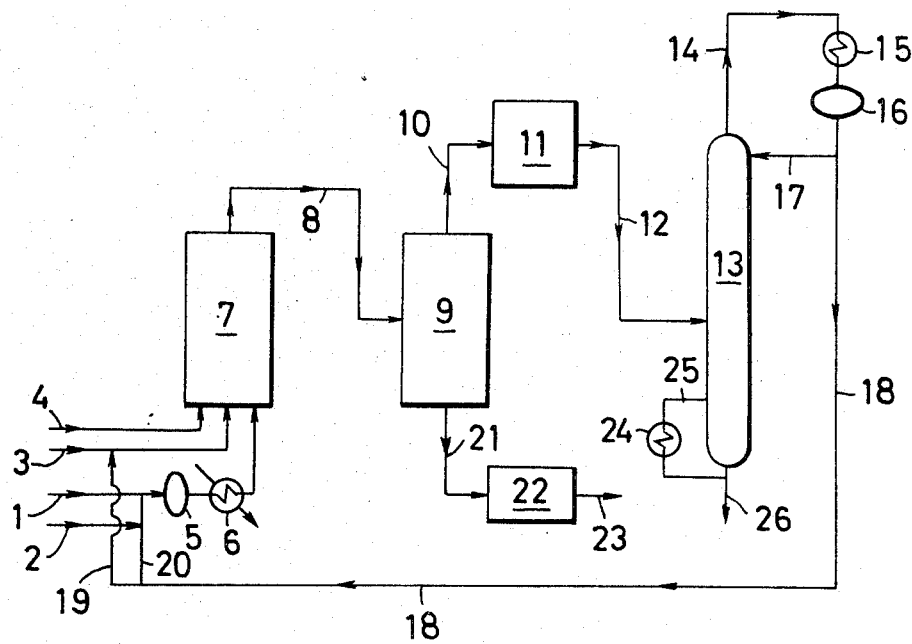

3,631,013
METHOD FOR MAKING SOLID RUBBERY COPOLYMERS OR ISOOLEFINS AND DIOLEFIN
Tatsuo Horie, Tokyo, Japan, assignor to Nippon Petrochemicals Co., Ltd., Tokyo, Japan
Filed Sept. 4, 1968, Ser. No. 757,389
Claims priority, application Japan, Sept. 10, 1967, 42/57,776
Int. Cl. C08d 3/06, 3/10
U.S. Cl. 260—85.3
6 Claims

ABSTRACT OF THE DISCLOSURE

A method for making solid rubbery materials by copolymerizing an isoolefin and a diolefin in an alkyl halide as solvent with boron trifluoride and a metal compounds $M(OR)_mX_n$ as catalyst wherein M is Al or Ti, R is a hydrocarbon radical or a halogenated derivatives thereof, X is a halogen, which comprises introducing monomers, recycled solvent defined as follows, metal compound $M(OR)_mX_n$ and boron trifluoride into the polymerization reactor and carrying out polymerization reaction at a temperature below 0° C., preferably from −50° C. to −110° C., and withdrawing polymerized mixture continuously from the polymerization reactor, bringing said mixture into contact with a heating medium to evaporate and separate low boiling fraction mainly containing the solvent and unreacted monomers from the polymer produced, drying and fractionating said low boiling fraction to distil the solvent containing the unreacted monomer, recycling said solvent, wherein said boron trifluoride introduced into the reaction system is not previously mixed with said recycled solvent or the monomers.

---

This invention relates to a novel method for making solid rubbery materials from an isoolefin and a diolefin. More particularly, this invention relates to a novel method for making solid rubbery materials from an isoolefin and a diolefin in an alkyl halide as the solvent with boron trifluoride and a metal compound $M(OR)_mX_n$ as the catalyst which comprises introducing monomers, recycled solvent defined as follows, metal compound $M(OR)_mX_n$ and boron trifluoride into the polymerization reactor and carrying out polymerization reaction at a temperature below 0° C., preferably from −50° C. to −110° C., and withdrawing polymerized mixture continuously from the polymerization reactor, bringing said mixture into contact with a heating medium to evaporate and separate low boiling fraction mainly containing the solvent and unreacted monomers from the polymer produced, drying and fractionating said low boiling fraction to distil the solvent containing the unreacted monomer, recycling said solvent, wherein said boron trifluoride introduced into the reaction system is not previously mixed with said recycled solvent or the monomers.

A large number of studies have been known on the homopolymerization of an isoolefin, particularly isobutylene, or copolymerization of such isoolefin and a diolefin in the presence of a variety of catalysts. For example, the following catalysts are known: the Friedel-Crafts type catalysts such as aluminum chloride, aluminum bromide, and titanium tetrachloride which are described in Japanese patent publication No. 7943 of 1956; double salts soluble in an alkyl halide such as $AlCl_3 \cdot Ti(OC_2H_5)_4$ and $$TiBr_4 \cdot TiO, OC_2H_5)_2$$

which are described in U.S. Pat. No. 2,440,498;

$$(C_2H_5)AlCl_2$$

in a polar solvent as described in Japanese patent publication No. 1144 of 1963; organometallic compounds such as $BF_3\text{-}Al(C_2H_5)_3$ which are described in Japanese patent publication No. 15489 of 1962; the $$Al(OH)_2(O\text{-}secBu) \cdot 2BF_3\text{-}TiCl_4$$

type catalyst as described in J. Polymer Sci., 53, 281 (1961); boron trifluoride and aluminum chloride as described on pages 98 and 99 in H. Gutterbock's "Polyisobutylen und Isobutylen-Mischpolymerisate" (1959); and $SiCl_4\text{-}(C_2H_5)_2AlCl$ as described in U.S. Pat. No. 3,066,123.

It is, however, difficult to effectively obtain commercially useful high molecular weight solid rubbery materials by using such catalysts. In particular, to make a vulcanizable synthetic rubber by the copolymerization of an isoolefin and a diolefin, a diolefin such as butadiene and isoprene should be used as the comonomer; such comonomer inhibits the growth of polymers, causing a considerable reduction in the molecular weight, and the only method capable of making vulcanizable isoolefin-diolefin copolymers of practical value on a commercial scale utilizes aluminum chloride as the catalyst. Even with aluminum chloride, the chain transfer and termination reactions become active at high temperatures, and useful copolymers can be obtained only at extremely low temperatures (about −100° C.) with an alkyl halide as a solvent. Moreover, since aluminum chloride is solid and not very soluble in an alkyl halide to be used as the solvent, it is necessary to dissolve the catalyst in a large quantity of the solvent and introduce such catalyst solution into the polymerization vessel in the method using the aluminum chloride catalyst. If traces of the monomers are present in the solvent during preparation of the catalyst solution, the polymerization of said monomers takes place immediately to yield viscous low molecular weight polymers which not only reduce the catalyst efficiency but also contaminate the produce polymers and lower the product quality markedly. Furthermore such low molecular weight polymers adhere to and block various parts of the vessel for preparing the catalyst solution. As a consequence, in a commercial method for making isoolefin-diolefin copolymers using the aluminum chloride catalyst, it is necessary to use at all times a dry and completely monomer-free solvent in an amount as much as about 10% of the total solvent which is used in large quantities for the polymerization reaction. For this purpose, the polymerization product is flashed, a portion of the vapor coming out of the flashing zone is recovered and purified to a sufficiently low content of the unreacted monomer, and the recovered solvent is supplied to the preparation of the catalyst as aforementioned, for example, in Japanese patent publication No. 6894 of 1955. In the chemical industry dealing with the solution polymerization, the recovery and purification of the solvent generally occupy a large portion of the overall production cost, and to lay such a burden as mentioned above on the solvent recovery and purification steps is definitely a disadvantage.

An object of this invention is to cover the above-mentioned disadvantages and provide a novel method for effectively making commercially useful solid rubbery isoolefin-diolefin copolymers.

According to this invention, the foregoing object can be attained as follows. In the production of copolymers from an isoolefin and a diolefin in the solvent alkyl halide in the presence of boron trifluoride and a metal compound $M(OR)_mX_n$ as the catalyst, the polymerization product is withdrawn continuously from the polymerization vessel and brought into contact with a heating medium to separate the low-boiling fraction consisting mainly of the solvent and the unreacted monomers from the polymer; said low-boiling fraction is dried and fractionated to distil the solvent containing the unreacted monomers, the distillate is recycled to the polymerization reactor.

Boron trifluoride and a metal compound $M(OR)_mX_n$ are used as the catalyst components in this invention. In the formula for the metal compound, M denotes aluminum or titanium and R denotes one or more than one group selected from the following: alkyl groups such as methyl, ethyl, n-butyl, and sec-butyl; cycloalkyl groups such as cyclopentyl and cyclohexyl; aryl groups such as phenyl and toluyl; aralkyl groups such as benzyl and phenethyl; and halogenated derivatives thereof.

On the other hand, X denotes a halogen such as chlorine and bromine; $m$ is not zero and $m+n$ is equal to the valence of aluminum or titanium. When the homopolymerization of an isoolefin or copolymerization of an issolefin and a diolefin is carried out using boron trifluoride and the metal compound $M(OR_1)_p(OR_2)_qX_r$ as the catalyst components, the catalyst efficiency is high, the reproducibility of the polymerization is good, and high molecular weight polymers can be obtained at relatively higher temperatures than those necessary for the hitherto known catalysts as is described in Belgian Pat. No. 704,956. In this invention, a metal compound $M(OR)_mX_n$ containing either aluminum or titanium which shows the above-mentioned effects most pronouncedly among the metal compounds is used as one component of the catalyst. When an aluminum compound is used, the product quality does not deteriorate appreciably even when the catalyst is not completely removed in the catalyst removing step. Typical metal compounds $M(OR)_mX_n$ which can be used as the catalyst component in the method of this invention are as follows:

$Al(OC_2H_5)_3$,
$Al(OCH_3)_2(OC_2H_5)$,
$Al(O-nC_4H_9)_3$,
$Al(O-secC_4H_9)_3$,
$Al(O-secC_4H_9)_2Cl$,
$Al(O-C_3H_7)_2Br$,
$Al(O-isoC_3H_7)Cl_2$,
$Al(O-C_6H_4CH_3)_3$,
$Ti(O-C_2H_5)_4$,
$Ti(O-nC_4H_9)_3(O-C_3H_7)$,
$Ti(O-nC_4H_9)Cl_3$,
$Ti(O-isoC_3H_7)_2(O-nC_4H_9)Cl$,
$Ti(O-nC_4H_9)_3Br$, and
$Ti(O-C_2H_4Cl)_3Cl$.

The solvent to be used for the reaction in this invention is an alkyl halide, preferably methyl chloride, ethyl chloride, n-propyl chloride or methylene chloride. The isoolefins include isobutylene, 2-methylbutene-1, and 2-methylpentene-1 and the diolefins suitable for this invention contain from 4 to 10 carbon atoms such as butadiene, isoprene, 2,4-dimethylbutadiene, piperylene, cyclopentadiene, hexadiene, divinylbenzene, cyclohexadiene, and vinylcyclohexene.

The above-mentioned alkyl halides are suitable solvents for the copolymerization of the monomers in question for the following reasons. Such alkyl halides do not dissolve the polymers formed but disperse them in a slurry; because of this the viscosity inside the polymerization vessel does not go up appreciably, agitation or flowing remains easy, and the reaction system can be cooled by heat exchange. Consequently, local heating due to the heat of polymerization is minimized and the amount of low molecular weight polymers resulting from a temperature rise is small. Those alkyl halides which are used in this invention are polar compounds, and they are considered to have such properties as to suppress the termination and chain transfer reactions by working effectively on the active site of the catalyst and help to form higher molecular weight polymers.

The above-mentioned monomers, catalyst, and solvent are used in the polymerization reaction of this invention. The reaction vessel for such polymerization may be any of the following types: the agitating tank type, the draft tube type reactor as described in U.S. Pat. No. 2,636,026, and the rotating flow type which was earlier applied for patent by the present inventors. The monomers of the isoolefin and diolefin, the solvent recovered in the manner to be described later, and the metal compounud $M(OR)_mX_n$ which is one component of the catalyst are cooled and introduced into the reactor in liquid phase. In this case, all four may be introduced into the reactor from separate inlets, or any two or three or all four may be mixed previously in separate storage tanks or transport lines, cooled, and introduced into the reactor. A distinctive feature here is that the metal compound $M(OR)_mX_n$ does not cause any undesirable reactions, not to speak of the polymerization, when it is mixed with the monomers before or after cooling. Furthermore, the catalyst efficiency does not fall when boron trifluoride is introduced in succession.

In the method of this invention, boron trifluoride which is another component of the catalyst is continuously introduced into the reaction system in gas or liquid phase from an inlet substantially without being mixed with said recycled solvent or with the monomers previously. Polymerization takes place effectively only when the isoolefin, the diolefin, the solvent, the metal compound $M(OR)_mX_n$, and boron trifluoride are mixed completely. Polymerization also takes place when the momomers and boron trifluoride are substantially mixed, but in such case, the polymers obtained show much lower molecular weight than is possible by the method of this invention.

The proportion of the catalyst to be used is chosen such that boron trifluoride is from 10 to 0.001 mole percent and the metal compound $M(OR)_mX_n$ is from 5 to 0.001 mole percent, preferably from 1 to 0.001 mole percent, all based on the monomers. Of the two monomers to be used, the diolefin is used in an amount less than 30 mole percent of the total monomers. The amount of the diolefin is reflected in the degree of unsaturation in the copolymers which is a measure of vulcanizability, and it can be varied depending upon the kind of product to be desired.

The polymerization is carried out under cooling at a temperature below 0° C. preferably in the range from —50° C. to —110° C. The polymerization product becomes swollen to some extent by the action of the solvent and the unreacted monomers and forms a slurry dispersed in the liquid phase. The reaction mixture is withdrawn from the reactor and brought into contact with a heating medium to evaporate off the solvent and the unreacted monomers. This step is generally called flashing. The flashing operation can be performed in this invention in any known manner such as the following: the overflow of the product from the reactor is brought into contact with warm water and led into a warm water tank as described in Japanese patent publication No. 2645 of 1954; the polymerization product is led into a stream of steam and flashed into warm water as shown in Japanese patent publication No. 13343 of 1961; the reaction product is withdrawn from the top of the reactor and led by a hot jet stream into a flash drum where it comes into contact with warm water as described in U.S. Pat. No. 2,504,488. The method now under application for patent which uses a dry gas or a dry liquid as a suction medium to such the polymers to be contacted thereafter with a heating medium is also applicable. Any of the methods mentioned above can effectively bring the polymerization product into contact with the heating medium and separate the solvent, unreacted monomers, and by-products from the polymers.

The heating medium to be used in this invention includes hot water, hot alcohol, and steam. The polymers which are separated from the solvent and the unreacted monomers are dispersed in the heating medium, and they are taken out from the flashing apparatus and go through the steps of addition of additives, dehydration, and drying to the final product in the usual manner.

The separated solvent, unreacted monomers, and by-products ordinarily entrain the vapor of the heating medium, and they are recovered from the top of the flashing tank. The mixture of vapors thus recovered is sent to the drying step where it is dried and then to the distillation and purification step. In the prior methods of polymerization using aluminum chloride as the catalyst, it is necessary in this distillation and purification step to recover two fractions, one being a highly pure solvent free from unreacted monomer for the preparation of the catalyst and the other a solvent containing the unreacted monomers to be supplied directly to the reactor. Since the former fraction to be used for the preparation of the catalyst should be of such a high purity as to be substantially free of the unreacted monomers, its purification requires a fractionating step with the reflux ratio of more than 10, and besides the fractionation should be controlled with utmost care as described, for example, in Japanese patent publication No. 5094 of 1960.

As mentioned above, the high purity solvent is not necessary in this invention, and it is sufficient to recover the solvent containing the unreacted monomers and supply this as recovered solvent to the polymerization system.

This advantage is due to the fact that boron trifluoride which is one component of the catalyst may be present as gas or liquid and can be charged into the reactor as it is without a solvent and there is no need for the catalyst preparation step. In addition, the metal compound $M(OR)_mX_n$ which is the other component of the catalyst is, as mentioned earlier, inert to the monomers in the absence of boron trifluoride, and it can be introduced into the reactor not only alone but also mixed with the monomers without any adverse effects.

In the method of this invention, a mixture containing the solvent, the unreacted monomers, a small amount of by-products such as diisobutylene, and impurities accompanied by a small amount of monomers such as butene-1 and butene-2 is subjected, after the separation and drying steps, to the extremely simple distillation step where the by-products and accompanied impurities are separated from the rest, and the fraction containing substantially only the solvent and the unreacted monomers is recycled to the reactor to be used as the solvent.

The method of this invention will be further described with reference to the drawing in which one examplar flow diagram is illustrated. The isoolefin monomer is supplied by line 1, the diolefin monomer by line 2, and part of the recovered solvent by line 20 respectively into tank 5 and mixed therein. The resultant mixture is cooled by cooler 6 to from −50° C. to −110° C. and supplied to polymerization reactor 7. The metal compound $M(OR)_mX_n$ supplied by line 3 is mixed with another part of the recovered solvent coming by way of line 19 and the mixture is supplied to reactor 7. The mixture may be cooled before introduction into the reactor. Gaseous or liquid boron trifluoride is directly introduced by line 4 into reactor 7. The reacted mixture is sent from reactor 7 by way of line 8 to flashing apparatus 9. The heat transfer medium is sent by line 27 into flashing apparatus 9 and the solvent, the unreacted monomers, and low-boiling by-products are evaporated off and separated from the polymerization product. The polymers produced are taken out dispersed in a portion of the heating medium from line 21, go through the post-treatment steps 22 such as dehydration and drying and emerge as the final product from 23. The gaseous products evaporated and separated in flashing apparatus 9 are sent to drying step 11 by way of line 10 and then to fractionating tower 13. The vapor coming out from the top of the fractionating tower through 14 is cooled in cooler 15 and stored in tank 16 as liquid. A portion of the liquid in tank 16 is returned to the fractionating tower as a reflux and another portion is sent by way of line 18 as the recovered solvent. Part of the unreacted monomers is removed from the bottom of the fractionating tower together with the by-products and the impurities accompanying the monomers by way of line 26. Part of the bottom oil is heated by heater 24 and recycled to the fractionating tower by line 25.

As described above, this invention characteristically provides a method for the production of commercially useful solid rubbery materials wherein boron trifluoride and the metal compound $M(OR)_mX_n$ are used as the catalyst and the highly purified solvent is not required for recycle.

This invention is described in further detail with reference to an example, but it is not limited by it.

EXAMPLE 1

The solid rubbery materials were made by copolymerization of isobutylene and isoprene according to the flow diagram illustrated in the drawing. Isobutylene was introduced at a rate of 51.8 kg./hr. by way of line 1, and isoprene at a rate of 1.5 kg./hr. by way of line 2. The recycled recovered solvent which was supplied to the reactor by way of lines 18, 19, and 20 contained methyl chloride (204 kg./hr.) and the unreacted isobutylene (9 kg./hr.). Aluminum sec-butoxide $Al(O-secC_4H_9)_3$ was introduced by line 3 and the gaseous boron trifluoride by line 4. The polymerization was carried out at −78° C., and the reaction mixture withdrawn from the reactor contained 204 kg./hr. of methyl chloride, 16./hr. of the unreacted isobutylene, 0.2 kg./hr. of the unreacted isoprene, about 0.002 kg./hr. of by-products having more than 5 carbon atoms, and 45.5 kg./hr. of the polymers. The mixture was flashed with warm water to separate the polymers and the vapors. The vapors thus evaporated and separated were first sent to the drying step and then introduced into the middle zone of fractionating tower 13. The mixture thus introduced contained 204 kg./hr. of methyl chloride, 16.7 kg./hr. of the unreacted isobutylene, 0.2 kg./hr. of the unreacted isoprene, and about 0.002 kg./hr. of the impurities. The fractionating tower was run with the reflux ratio of 1.5 and the recovered solvent was taken out at a rate of 213 kg./hr. by line 18. The recovered solvent contained 9 kg./hr. of the unreacted isobutylene. The $C_4$ fraction mainly consisting of isobutylene and the $C_5$ and higher fraction mainly containing isoprene were recovered from the bottom of the fractionating tower at rates of 7.7 kg./hr. and 0.2 kg./hr. respectively. A water slurry containing 3% of the polymers was obtained from the flashing apparatus at a rate of 1513 kg./hr. This slurry was subjected to the post-treatment steps such as dehydration and drying and the solid rubbery isobutylene-isoprene copolymers were obtained. The degree of unsaturation of this product was 2.4 (as determined by the iodine titration method in the presence of mercury acetate) and the Mooney viscosity (ML–8, 100° C.) was 45–48.

EXAMPLE 2

The solid rubbery materials were made by the same method as described in Example 1 except for using $Ti(O\text{-}isoC_3H_7)_2(O\text{-}nC_4H_9)Cl$ in place of $Al(O\text{-}secC_4H_9)_3$. The degree of unsaturation of this product isobutylene-isoprene copolymer was 2.3 and the Mooney viscosity (ML–8, 100° C.) was 44–46.

What is claimed is:

1. In a continuous process for making solid rubbery materials by copolymerizing an isoolefin and a diolefin in an alkyl halide solvent with boron trifluoride and a metal compound $M(OR)_mX_n$ catalyst, wherein M is Al or Ti, R is a hydrocarbon radical or a halogenated derivative thereof, X is a halogen, $m$ is not zero, and $(m+n)$ represents the valence of Al or Ti, a method which comprises,
   (i) introducing (a) isoolefin and diolefin monomers (b) recycled solvent defined as follows and (c) metal compound $M(OR)_mX_n$ continuously into the reactor separately from each other or together by premixing any two or more of said (a), (b) and (c),
   (ii) also introducing boron trifluoride continuously into the reactor without being previously mixed with any one of (a), (b) or (c), (iii) carrying out polymerization reaction at a temperature below 0° C., preferably from —50° C. to —110° C.

(iv) withdrawing polymerized mixture continuously from the polymerization reactor, bringing said mixture into contact with heating medium to evaporate and separate low boiling fraction mainly containing the solvent and unreacted monomer from the polymer produced.

(v) drying and fractionating said low boiling fraction to distil the solvent containing the unreacted monomer, as the recycled solvent without recovering completely monomer free solvent.

2. A method according to claim 1 wherein said isoolefin is a member selected from the group consisting of isobutylene, 2-methylbutene-1 and 2-methylpentene-1, and said diolefin is a member selected from the group consisting of butadiene, isoprene, 2,4-dimethylbutadiene, hexadiene, divinylbenzene, cyclohexadiene and vinylcyclohexene.

3. A method according to claim 1 wherein said metal compound $M(OR)_m X_n$ is a member selected from the group consisting of $Al(OC_2H_5)_3$, $Al(OCH_3)_2(OC_2H_5)$, $Al(O\text{-}nC_4H_9)_3$, $Al(O\text{-}secC_4H_9)_3$, $Al(O\text{-}secC_4H_9)_2Cl$, $Al(O\text{-}C_3H_7)_2Br$, $Al(O\text{-}isoC_3H_7)Cl_2$ $Al(O\text{-}C_6H_4CH_3)_3$, $Ti(O\text{-}C_2H_5)_4$, $Ti(O\text{-}nC_4H_9)_3$ $(O\text{-}C_3H_7)$, $Ti(O\text{-}nC_4H_9)Cl_3$, $Ti(O\text{-}isoC_3H_7)_2$ $(O\text{-}nC_4H_9)Cl$, $Ti(O\text{-}nC_4H_9)_3Br$ and $Ti(O\text{-}C_2H_4Cl)_3Cl$ 4. A method according to claim 1 wherein the solvent is a member selected from the group consisting of methyl chloride, ethyl chloride, n-propyl chloride and methylene chloride.

5. A method according to claim 1 wherein said solvent containing unreacted monomers is introduced into the reactor previously mixed with the metal compound $M(OR)_m X_n$ and with the monomers.

6. A method according to claim 1 wherein the amount of boron trifluoride is from 0.001 mol percent to 10 mol percent and metal compound $M(OR)_m X_n$ is from 0.001 mol percent to 5 mol percent based on the monomers, respectively.

References Cited

UNITED STATES PATENTS

| | | | |
|---|---|---|---|
| 2,440,750 | 5/1948 | Kraus | 252—429 |
| 2,931,791 | 4/1960 | Ernst | 260—85.3 |
| 2,999,083 | 9/1961 | Killey | 260—85.3 |
| 3,262,887 | 7/1966 | Calfee | 252—429 |
| 3,402,164 | 9/1968 | Miyoshi et al. | 260—94.8 |
| 3,324,094 | 6/1967 | Tanaka et al. | 260—88.2 |
| 3,472,830 | 10/1969 | Baxter et al. | 260—94.2 |
| 3,493,549 | 2/1970 | Uemura et al | 260—85.3 |

OTHER REFERENCES

Olah "Friedel-Crafts and Related Reactions" (1963) (pp. 228–231 and 312–313), Interscience Publishers, New York, N.Y.

JOSEPH L. SCHOFER, Primary Examiner

R. A. GAITHER, Assistant Examiner

U.S. Cl. X.R.

260—88.2 C, 88.2 E